358-86. XR 3,869,564 SR

United States Patent [19]

Colodny

[11] 3,869,564

[45] Mar. 4, 1975

[54] TRUNK SWITCHING SYSTEM

[75] Inventor: Samuel H. Colodny, Levittown, Pa.

[73] Assignee: American Electronic Laboratories, Inc., Colmar, Pa.

[22] Filed: Aug. 30, 1973

[21] Appl. No.: 392,998

[52] U.S. Cl. ............... 178/6, 178/DIG. 13, 325/308

[51] Int. Cl. .......................... H04n 7/18, H04h 1/02

[58] Field of Search .......... 178/DIG. 13, DIG. 12, 6; 325/2, 3, 308, 31

[56] References Cited

UNITED STATES PATENTS

| | | | |
|---|---|---|---|
| 2,699,495 | 1/1955 | Magnuski | 325/2 |
| 3,502,801 | 3/1970 | Mayle | 178/5.8 R |

*Primary Examiner*—Howard W. Britton

*Assistant Examiner*—Michael A. Masinick

*Attorney, Agent, or Firm*—Jacob Trachtman

[57] ABSTRACT

A trunk switching system for the transmission of a plurality of television channel signals comprising switching means having first and second input terminals each for respectively receiving a plurality of television channel signals from first and second sources and an output terminal the switching means having a first normal position transmitting signals received at its first terminal to its output terminal and a second position transmitting signals received at its second terminal to its output terminal, and detecting means receiving the signals received by the first input terminal and activating the switching means to its second position upon its failure to receive television channel signals.

10 Claims, 6 Drawing Figures

T 5102

X 5002

TRUNK SWITCHING SYSTEM

Figures 1, 2, 3:
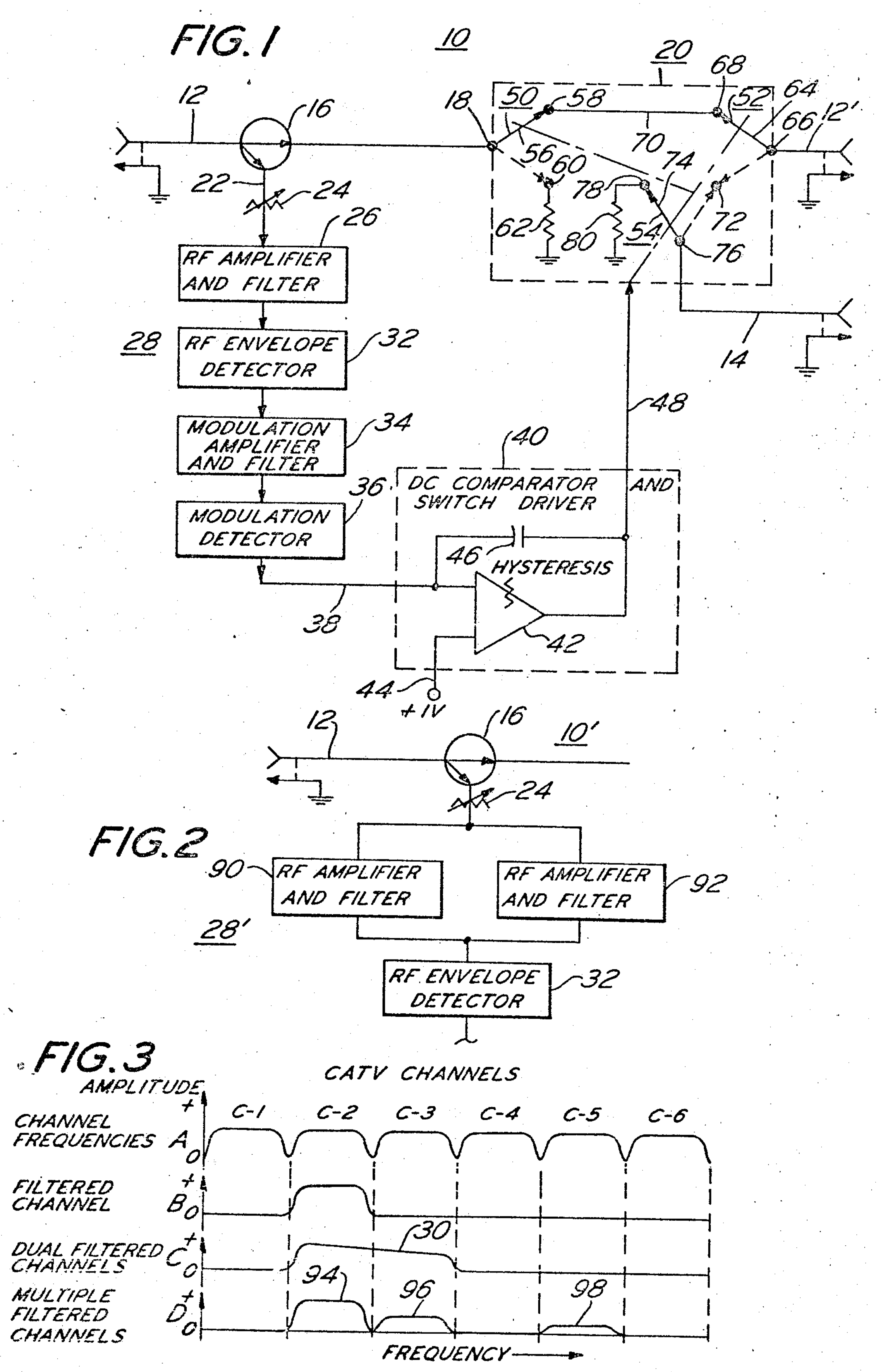

The invention relates to a trunk switching system, and more particularly to a switching system for CATV or community cable television in which upon the failure to receive signals from a first or main source, the switching system delivers signals from a second or auxiliary source of television signals.

Heretofore, trunk switching systems for CATV have provided switching means for switching from a first to a second source of signals upon certain conditions, such as failure to receive signals from the first source. However, difficulty has been occasioned in distinguishing the presence of information or television signals from amplified radio frequency noise signals. Such noise signals occur when an amplifier in a cascade of amplifiers loses its input signal and its automatic gain control turns its gain and slope controls "wide open." This represents an extra gain at each cascade amplifier of 5 dB to 10 dB, depending upon the ambient temperature at the time of the signal failure. For only 5 to 10 cascade amplifiers or stations, this can be sufficient amplification of the input noise level to a trunk switching system, so that a simple radio frequency magnitude detector at the trunk switch will not be able to distinguish "program" radio frequency signals from "noise" radio frequency signals. To be effective a trunk switching system must be capable of recognizing the absence of a "TV program" signal.

It is, therefore, a principal object of the invention to provide a new and improved trunk switching system which can distinguish between the presence of noise radio frequency signals and TV information radio frequency signals.

Another object of the invention is to provide a new and improved trunk switching system which receives and delivers a plurality of television channel signals from a first or main source, and upon failure to receive signals from the main source, delivers signals from a second or auxiliary source.

Another object of the invention is to provide a new and improved trunk switching system which detects the scanning frequency signal of the television information signal for determining the presence of television channel signals.

Another object of the invention is to provide a new and improved trunk switching system which detects one or more television channel signals for increasing its reliability in detecting failure to receive signals from the main source of signals, while minimizing interference between a plurality of detected television channel signals.

Another object of the invention is to provide a new and improved trunk switching system which minimizes switching of signals upon momentary loss of signals from the first or main source of signals or momentary power failure along the path of signals to the switching system.

Another object of the invention is to provide a new and improved trunk switching system which is highly reliable in operation, and minimizes switching between input signal sources upon minute changes in signal level, and is adaptable for use in various locations along CATV trunk lines.

The above objects of the invention as well as many additional objects are achieved by providing a trunk switching system for transmitting a plurality of television channel signals comprising a switching means having first and second input terminals for respectively receiving a plurality of television channel signals from first or second sources. The switching means has a first normal position providing transmission of signals received at its first terminal to its output terminal, and a second position which transmits signals received at its second terminal to its output terminal. A detecting means detects receipt of at least one of the plurality of television channel signals received by the first input terminal of the switching means, and upon its failure to detect the presence of such a signal, activates the switching means to its second position for delivering to the output terminal signals from the second or auxiliary source of television channel signals. The detecting means discriminates between noise signals and determines the presence of television channel signals by detecting the presence of the scanning signal component of the television signal.

In another form, the detecting means detects the receipt of television channel signals at the first input terminal of the switching means by determining the presence of the scanning signal component in the television signals of selected first and second channels. The signals of the second channel are attenuated with respect to the signals of the first channel, so that in the presence of detected signals produced by the receipt of signals of both the first and second channels, the detected signal of the first channel will be dominate over the signal of the second channel. This reduces interference effects between the first and second channel signals. In the absence of first channel signals, the detected channel signals are prevalent. By such means, the failure to receive channel signals in the first channel, will not result in switching of the switching means to the auxiliary source, since the presence of the second television channel signals indicates that there is no failure in transmission of signals from the main or first source. Of course, third and additional channels may also be concurrently detected by the detector means by arranging for the detected signals to have their respective amplitudes reduced in steps, to avoid interference between detected signals.

The detecting means includes a switch activating means provided by a signal comparator comprising a high gain amplifier with capacitor feedback having a time constant which prevents switching of the switching means in the absence of a detected signal over a short interval. The comparator is also provided with a reference level signal, and delivers an output signal to the switching means for input signals exceeding the level of the reference signal. This arrangement provides for switching from the first or main source of signals to the second or auxiliary source of signals when signals derived from the first source are attenuated to a level providing a detected signal having an amplitude which is less than that of the reference level signal. This assures a minimum grade or quality for the transmitted television signals.

The foregoing and other objects of the invention will become more apparent as the following detailed description of the invention is read in conjunction with the drawing, in which:

FIG. 1 is a schematic block diagram of a trunk switching system embodying the invention, FIG. 2 is a schematic block diagram illustrating a modified form of a portion of the trunk switching system shown in FIG. 1, and FIGS. 3A–3D are graphic representations illustrating characteristics of the trunk switching systems of FIGS. 1 and 2.

Like reference numerals designate like parts throughout the several views.

Refer to FIG. 1 which discloses a trunk switching system 10 embodying the invention. In a CATV network, the trunk lines are provided therealong with many stations for amplifying the signal being transmitted, and complex networks of such lines are provided for transmission of television signals to large numbers of receivers at different locations. Upon transmission failure, which may result from a break in a transmission line or cable, the loss of power or the malfunction of equipment, the signals derived from a first or main source may be lost or deteriorated, so that signals must be derived from a second or auxiliary source for continuous transmission of information or program material along the transmission line. The trunk switching system 10, determines whether television channel signals received from a first source over a line 12 are no longer being transmitted or have deteriorated to a level where they are no longer desirable for continued transmission along the line 12′. In the event of such failure, the trunk switching system 10 delivers television channel signals received over a line 14 from a second or auxiliary source of signals for transmission along the line 12′.

The signals from first and second sources are normally delivered along the respective lines or cables 12 and 14 and provide a plurality of television channel signals which may be in the assigned frequency channels in the VHF and UHF bands and in other such bands suitable for transmission of television signals.

FIG. 3A graphically illustrates a plurality of television channel signals in respective adjacent frequency bands or channels C–1 to C–6.

Such a plurality of television channel signals which are normally transmitted along the line 12, which line may be a coaxial cable with a grounded shield is received by a signal splitting device 16 of the system 10. The signal splitting device 16 can be a resistive tap, a broadband tap transformer or broadband directional coupler, such as that disclosed in U.S. Pat. No. 3,426,298 and well known in the art. The device 16 has a first output passing the input signals to the input terminal 18 of a switching means 20, and a second output delivering a portion of the received signals to the input line 22 of a detecting means 28. The signals on line 22 are passed through a variable attenuating network 24, reducing the amplitude of the signals to a desired level. The network 24, thus, adapts the system 10 for use at various locations along a line having different signal levels while still providing the desired input signal to the detecting means 28.

The signals from the network 24 are delivered to an RF amplifier and filter 26 which has a band width for passing a single selected TV channel signal as illustrated in FIG. 3B. The filter 26, however, can be designed to pass 2 adjacent TV channel signals as illustrated in FIG. 3C. Such an RF amplifier and filter 26 may be similar to the IF amplifier described on page 426 of "Transistors and Active Circuits" by John G. Linvill and James F. Gibbons, McGraw-Hill Book Company, Inc., 1961, except that conventional emittor degeneration is included.

In the case of the dual filtered channels illustrated in FIG. 3C, the characteristic 30 of the RF amplifier and filter 26 provides a slope, so that the channel C–3 which is adjacent to channel C–2 is attenuated with respect to the channel C–2 by approximately 6 dB. This relationship minimizes interference between detected signals as will be explained more fully below.

The signals passed by the amplifier and filter 26 are received by a radio frequency envelope detector 32, which removes the radio frequency carrier signals, and provides the envelopes or modulation signals as the detected signals. The design of such an envelope detector is described in "Radio Engineers Handbook" by Terman, Mc-Graw-Hill Book Company, Inc., First Edition, on page 554 of Section 7 entitled "Modulation and Demodulation." The Radiotron Designers Handbook, RCA Wireless Press, Fourth Edition, on page 1072 and following also discloses such envelope detector, except that a semi-conductor diode is used.

The envelope detector 32 delivers its detected output signals to a modulation amplifier and filter 34. The modulation amplifier and filter 34 includes a bandpass filter which passes the scanning signals of the TV channel signals being processed. The scanning signals of a TV signal include both horizontal and vertical scanning frequencies. The horizontal scanning frequency, of course, is a multiple of the vertical scanning frequency, depending upon the number of horizontal scan lines of the TV picture. Although the amplifier and filter 34 may be designed to pass either the vertical or horizontal scanning signals for the purpose of the invention, the utilization of the higher frequency horizontal scanning signal is preferred. This is because of the relatively greater energy content of the horizontal scanning signal. A preferred embodiment of the modulation amplifier and filter 34 is disclosed in "Transistors and Active Circuits" by John G. Lenvill and James F. Gibbons of McGraw-Hill Book Company, Inc., 1961, Chapter 19, except that the high-frequency cut-off was purposely decreased by adding shunt capacitance, and low-frequency cut-off was increased by limiting the value of coupling capacitor. Alternatively, a broadband amplifier and a bandpass filter, or an amplifier and a feedback circuit, such as a bridged tee, can provide the same gain and selectivity.

The scanning signals from the amplifier and filter 34 are delivered to a modulation detector 36 which provides a d.c. output signal in the presence of an input signal. The detector 36 which can be a peak signal detector may have a design similar to the envelope detector 32, but is provided with a large RC (resistance-capacitance) time constant load to store the voltage of the detected signal for an appreciable part of a second.

The output signal from the modulation detector 36 is delivered over a line 38 to the input of a direct current comparator switch driver 40. The d.c. comparator 40 is essentially a high gain d.c. amplifier module 42 which receives the input signal over the line 38 and has a second input line receiving a reference level signal, such as a +1 signal. The module 42 has capacitive feed-back provided by a capacitor 46 giving a time constant of several seconds. This prevents switching of the switching means upon momentary interruption of signals from the source of signals at the head or input end of the transmission system, or due to momentary power failure along the path to the input of the system 10. In addition, hysteresis is provided by a resistive feed-back, so that switching back and forth for small changes in input level is avoided. This is achieved by requiring an input signal with a level several dB higher than the input signal before the system is switched to return the switching means 20 back to its normal or first terminal condition. A description of the time constant (integrator) and hysteresis properties are given in Motorola Application Note AN547, and is applicable to high gain d.c. amplifier utilized in the comparator and switch device 40.

The amplifier module 42 delivers an output signal only when the input d.c. signal over the line 38 exceeds the reference level signal on line 44. Thus, when an incoming signal over the line 12 has been degraded in amplitude, the d.c. signal on line 38 falls below the level of the signal on line 44, preventing the delivery of an output signal by the amplifier module 42. This results in switching action by the switching system 10, thus, preventing delivery of an inferior, low grade signal and resulting in the substitution of the signal derived from another source, as will now be described.

The output signal from the d.c. comparator and switchdriver 40 is delivered over the line 48 to the switching means 20. The switching means 20 is schematically illustrated as having three switches 50, 52 and 54, which are arranged for concurrent actuation from their first or normal terminal positions shown by the solid lines, to their second terminal positions indicated by dashed lines. The switch 50 is provided with an armature 56 which is pivotally connected with the input terminal 18 of the switching means 20 and normally engages the terminal 58. When in its second position the armature 56 engages the terminal 60 which is returned to ground potential through a load resistor 62.

The armature 64 of the switch 52 is pivotally joined with the output terminal 66 of the switching means 10. The terminal 66 is connected with the output line 12' for transmitting signals along the transmission path. The armature 64 is movable between its normal position engaging a terminal 68, and to a second position engaging the terminal 72. The terminal 66 is joined to the terminal 58 of the switch 50 over a line 70.

The switch 54 of the switching means 20 has an armature 74 which pivotally engages a second input terminal 76 which is joined with the line 14 for receiving television signals from a second or auxiliary source. In its normal position, the armature 74 engages a terminal 78 which is returned to ground potential through a load resistor 80. In its second position, the armature 74 also engages the terminal 72, which is concurrently engaged by the armature 64 of the switch 52.

When the switching means 20 is in its normal position incoming signals received along the line 12 pass through the switch 50 and the switch 52 for further transmission along the line 12'. The incoming signals from the auxiliary source received along the line 14 at the same time pass through the switch 54 and the load resistor 80 to ground potential, and are isolated from the transmission path of the signals received over line 12.

When the switching means 20 is activated to its second condition by receiving an output signal from the switch driver 40 over line 48, the switches 50, 52 and 54, assume their second terminal positions shown by the dashed lines. This results in the delivery of incoming signals on line 12 by the switch 50 to the grounded resistor 62. At the same time the incoming auxiliary signals on line 14 are delivered through switches 54 and 52 to the transmission line 12' to continue the transmission of program material to the locations therealong. Upon resumption of its normal condition by the switching means 20, the switches 50, 52 and 54 are again placed in their normal positions and transmission is continued from signals received over line 12 to the line 12'.

The switching means 20 although shown simplistically in schematic form may be of the type of radio frequency switch using semi-conductor diodes such as those described in the article entitled "Selecting the right diode for r-f switching circuits" by Robert Fekete, appearing in Electronics of Mar. 22, 1965, pages 70 to 77 inclusive. The switching means may use a combination of diode switch elements and reed relays to obtain high isolation and low through loss with a moderate current drain from a single polarity d.c. supply. Such a combination, provides the required performance in an economical manner, although other switching means may be utilized.

In operation of the trunk switching system 10, a plurality of television signals are received for continued transmission along the lines 12 and 12', the received signals being assigned frequency bands or channels, such as illustrated in FIG. 3A by channel C-1, C-2, and so forth. The splitting device 16 derives a sampling of the transmitting signals which are received at the input 18 of the switching means 20, and after the signals are adjusted to the proper amplitude by the attenuator 26, they are processed by the detecting means 28. The signals in one or more selected channels are amplified and transmitted by the RF amplifier and filter 26 to the RF detector 32. The detector 32 delivers the detected modulation signals to the modulation amplifier and filter 34. The filter 34 in turn delivers the selected scanning signals present in television signals to the modulation detector 36 which provides a direct current output signal. In the absence of television signals in the selected channels of the RF amplifier and filter 26, the modulation amplifier and filter 34 will not deliver an output signal, so that the modulation detector 36 will also fail to deliver an output signal over the line 38. Thus, even in the presence of high RF noise signals on the line 12, which may be produced by the RF amplifier stations going "wide open" upon the loss of an input signal, the detector 36 will nevertheless fail to deliver an output signal. With the absence of an output signal on a line 38, the driver 40 after a predetermined delay caused by the capacitive feedback, removes its output signal over line 48, causing the switching means 20 to switch from its normal to its auxiliary condition. This results, as noted before, in the transmission of the auxiliary signals received on line 14 to the line 12' for further transmission in place of signals from the main source over line 12. The comparator action of the driver 40, results in switching action when the output signal on line 38 falls below the reference level of the signal line 44, while the hysteresis characteristic provided by resistive feedback as noted above, prevents switching back and forth of the switching means 20 with small changes in the signals received on line 12.

When the signal on line 12 is restored to an acceptable level, the modulation detector 36 again delivers an output signal on line 38 of adequate level to result in the delivery of the output signal on line 48 and the return of the switching means 20 to its normal position. This allows transmission from the first or main source over the line 12 to be passed through the switching means 20 to the line 12', while the transmission of signals from the auxiliary source 14 is terminated through the load 80.

In order to avoid terminating the transmission of signals over line 12 upon the interruption or removal of a particular television channel signal which may have been selected for detection by the processing means 28, the bandpass filter of the RF amplifier filter 36 may be provided with an increased band width to cover several adjacent channels as illustrated in FIG. 3C. Thus, if the signal in channel C–2 is terminated, while the signal in channel C–3 is still present, an output signal of sufficient amplitude will still be delivered by the detector 36 for maintaining switching means 20 in its first or normal condition. Signal transmission, thus, will continue from line 12 through the switching means 20 to the line 12' without switching to the auxiliary source of signals.

However, in order to avoid interference problems resulting from the detection of the two scanning signals of such dual channels, as would result by the presence of television signals and channels C–2 and C–3, the RF amplifier and filter 26 provide an output characteristic which is a function of frequency as shown in FIG. C–3. This results in the signal in channel C–3 being attenuated with respect to the signal in channel C–2. An attenuation of 6 dB has been found sufficient to allow the detected scanning signal in channel C–2 to predominate over the detected signal in channel C–3. This is important, since with detected signals of equal amplitude, the output signals may be in phase opposition or have slightly different frequencies resulting in beat signals. This can provide a resultant signal which is reduced in amplitude, resulting in the delivery of a reduced signal on the output line 38. Such a reduced signal would improperly cause switching action of the switching means 20. With the absence of the dominating detected signal from channel C–2, the signal delivered in channel C–3 is of an amplitude providing an output signal by the detector 36 which is sufficient to avoid switching action.

FIG. 2 illustrates a trunk switching system 10' providing a modified signal processing means 28' in which the RF amplifier and filter 26 is provided by a plurality of RF amplifiers and filters 90 and 92, which may be identical to the amplifier 26. The RF amplifier filter 90, thus, may be characterized by the filter characteristic 94 illustrated in FIG. 3D passing television signals in channel C–2, while the RF amplifier and filter 92 may be provided with the filter characteristic 96 passing signals in channel C–3. As noted, the signals passed by the filter 92 are delivered with an amplitude which is attenuated with respect to the amplitude of the signals passed by the filter 90. This variation of amplitude, as noted above, limits interference between detected scanning signals and allows the detected scanning signal in channel C–2 to predominate in the presence of other detected signals, minimizing signal reducing effects due to phase and frequency variations. The RF amplifier and filter 92 may be provided with a filter characteristic for passing any of the other channel signals C–1 to C–6 and need not pass signals in the channel adjacent to the channel of signals passed by the filter 90. In situations, where desirable, a third amplifier and filter (not shown) may also be connected in parallel with the parallel connected filters 90 and 92 to pass the signals of a third channel, as illustrated in FIG. 3D by the bandpass characteristic 98 in the channel C–5. Again, the bandpass characteristic 98 provides an output amplitude which is further reduced with regard to the bandpass characteristics 94 and 96 of the filters 90 and 92, to avoid interference between detected scanning signals. As before, in the presence of signals in channels C–2, C–3 and C–5, the television signals in channel C–2 will result in the detection of a scanning signal which will be dominant over the other detected signals. In the absence of such a television signal in channel C–2, but in the presence of a television signal in the channel C–3, the detected signal in channel C–3 will dominate the detected signal in channel C–5. Finally, in the absence of television signals in the channel C–2 and C–3, but in the presence of a television signal in channel C–5, the detected signal delivered on the line 38 to the switchdriver 40 will provide sufficient amplitude to prevent switching of the switching means 20 to the auxiliary source signals. The use of multiple channels for detecting purposes, thus, increases the reliability of the system 10 in detecting the presence of acceptable signals from the first or main source, and avoids switching of the system 10 to the second or auxiliary sources signals.

While the invention has been described and illustrated with reference to several embodiments, it is to be understood that the invention is capable of various modifications and applications, not departing essentially from the spirit thereof.

What is claimed is:

1. A trunk switching system for concurrently receiving a plurality of television channel signals from more than one remote location and selectively transmitting signals from one of said remote locations comprising switching means having first and second input terminals for receiving a plurality of television channel signals respectively from first and second remote locations and an output terminal, said switching means having a first normal position transmitting signals received at its first terminal to its output terminal and a second position transmitting signals received at its second terminal to its output terminal, and detecting means receiving the signals received by said first input terminal of said switching means from said first remote location and activating said switching means to its second position upon its failure to receive television channel signals from said first remote location.

2. The switching system of claim 1 which said detecting means detects the receipt of at least one of said plurality of television channel signals and activates said switching means to its second position upon failure to receive at least one of said detected channel signals.

3. The switching system of claim 2 in which said detecting means detects the receipt of said television channel signals by detecting the presence of the scanning signal component of the television signal.

4. The switching system of claim 3 in which said detecting means includes filter means for passing at least one selected television channel signal and a detector receiving the signals passed by said filter means and delivering an output signal in the presence of the scanning signal component of the television signal for maintaining said switching means in its first position and activating said switching means to its second position in the absence of said scanning signal component.

5. A trunk switching system for transmission of a plurality of television channel signals comprising switching means having first and second input terminals for respectively receiving a plurality of television channel signals from first and second sources and an output terminal, said switching means having a first normal position transmitting signals received at its first terminal to its output terminal and a second position transmitting signals received at its second terminal to its output terminal, and detecting means receiving the signals received by said first input terminal of said switching means and activating said switching means to its second position upon its failure to receive television channel signals, said detecting means detecting the receipt of at least one of said plurality of television channel signals and activating said switching means to its second position upon failure to receive at least one of said detected channel signals, said detecting means detecting receipt of said television channel signals by detecting the presence of the scanning signal component of the television signal, said detecting means including filter means for passing selected television channel signals and a detector receiving the signals passed by said filter means and delivering an output signal in the presence of the scanning signal component of the television signal, said filter means passing respective television signals of selected first and second channels, the signals of the second channel having an amplitude which is reduced with respect to that of the signals of the first channel, whereby in the presence of detected signals produced by the receipt of signals of said first and second channels, the detected signals of the first channel will be dominant over the signals of the second channel reducing interference effects between said first and second channel signals, while in the absence of first channel signals, the detected second channel signals will be prevalent.

6. The switching system of claim 5 in which said filter means passes respective television signals of selected first, second and third channels, the signals of the second channel having an amplitude which is reduced with respect to that of the first channel while the signals of the third channel have an amplitude which is reduced with respect to that of the second channel, whereby in the presence of detected signals produced by the receipt of signals of said first, second and third channels, the detected signals of the first channel will be dominant over the signals of the second and third channels reducing interference effects between the detected signals, while in absence of the first channel signals the detected second channel signals will be dominant over the third channel signals, and in the absence of first and second channel signals the detected third channel signals will be prevalent.

7. The switching system of claim 5 in which the filter means is a bandpass filter passing selected television signals of first and second adjacent channels, the bandpass filter having a transmission characteristic by which the amplitude of signals passed in the second channel is attennuated by approximately 6 dB with respect to the amplitude of signals passed in the first channel.

8. A trunk switching system for transmission of a plurality of television channel signals comprising switching means having first and second input terminals for respectively receiving a plurality of television channel signals from first and second sources and an output terminal, said switching means having a first normal position transmitting signals received at its first terminal to its output terminal and a second position transmitting signals received at its second terminal to its output terminal, and detecting means receiving the signals received by said first input terminal of said switching means and activating said switching means to its second position upon its failure to receive television channel signals, said detecting means detecting the receipt of at least one of said plurality of television channel signals and activating said switching means to its second position upon failure to receive at least one of said detected channel signals, said detecting means detecting receipt of said television channel signals by detecting the presence of the scanning signal component of the television signal, said detecting means including a first filter means for passing at least one selected television channel signal, a first radio frequency envelope detector receiving the signals passed by said first filter means and delivering a detected signal, a second filter means passing the scanning frequency signals present in the detected signal from the envelope detector, a second detector receiving the signals from the second filter means and delivering a detected signal, and switch activating means receiving the detected signal from said second detector and activating said switching means to its second position in the absence of such a detected signal.

9. The switching system of claim 8 in which the switch activating means is a signal comparator comprising a high gain d.c. amplifier with capacitive feedback providing a time constant so that switching of the switching means does not occur upon the absence of a detected signal over short intervals, said comparator receiving a reference level signal and delivering an output signal for input signals exceeding the level of said reference signal.

10. The switching system of claim 8 in which the second filter means is a bandpass filter passing the signals with the frequency of the horizontal scanning frequency of said television signals.

* * * * *